United States Patent
Guang et al.

(10) Patent No.: US 7,898,220 B2
(45) Date of Patent: *Mar. 1, 2011

(54) RAPID CHARGE LITHIUM ION BATTERY CHARGER

(75) Inventors: Huang Tai Guang, Guangzhou (CN);
Robert F. Wentink, Chicago, IL (US);
Xia Ju Jie, Wuxue (CN); Li Wen Hua,
Huayang Town (CN)

(73) Assignee: ICC-Nexergy, Inc., Westchester, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/566,859

(22) Filed: Sep. 25, 2009

(65) Prior Publication Data

US 2010/0033137 A1    Feb. 11, 2010

Related U.S. Application Data

(60) Continuation of application No. 11/836,946, filed on Aug. 10, 2007, now Pat. No. 7,598,709, which is a division of application No. 11/241,718, filed on Sep. 30, 2005, now Pat. No. 7,626,362.

(51) Int. Cl.
*H02J 7/00* (2006.01)
(52) U.S. Cl. .................................. 320/135; 320/137
(58) Field of Classification Search .................. 320/135, 320/137, 128, 129
See application file for complete search history.

(56) References Cited

U.S. PATENT DOCUMENTS

| 5,471,128 A | 11/1995 | Patino et al. |
| 5,652,501 A | 7/1997 | McClure et al. |

(Continued)

FOREIGN PATENT DOCUMENTS

CN    1269616    10/2000

(Continued)

OTHER PUBLICATIONS

Fairchild Semiconductor Corp., Application Note AN4105, "Design Considerations for Switched Mode Power Supplies Using a Fairchild Power Switch (FPS) in a Flyback Converter:" www.fairchildsemi.com, DATE: 2002.

*Primary Examiner* — Bao Q Vu
*Assistant Examiner* — Nguyen Tran
(74) *Attorney, Agent, or Firm* — John S. Paniaguas; Katten Muchin Rosenman LLP (57) ABSTRACT

A rapid charging circuit for a lithium ion battery. The battery charger in accordance with the present invention compensates for the voltage drops across the various resistance elements in the battery circuit by setting the charging voltage to a level to compensate for the initial resistance of the series resistances in the circuit and an additional resistance selected to take into account the anticipated increase in resistance of the various circuit elements over time. The battery charger in accordance with the present invention periodically monitors the open-circuit voltage of the battery cell and reduces the charging voltage to when the battery cell voltage reaches the optimal value. Thus, during a constant current charging mode, the battery cell is driven at a relatively optimal charging current to reduce the charging time. As such, the system is able to optimize the charging current supplied to a battery cell during a constant current mode of operation while compensating for circuit elements whose resistance may vary over time due to temperature or other factors, such as corrosion, while at the same time avoiding exceeding the maximum recommended voltage for the battery cell.

5 Claims, 8 Drawing Sheets

U.S. PATENT DOCUMENTS

| | | | |
|---|---|---|---|
| 5,670,862 A | 9/1997 | Lewyn |
| 5,729,116 A | 3/1998 | Tsenter |
| 5,729,335 A | 3/1998 | Green |
| 5,869,949 A | 2/1999 | Nishikawa et al. |
| 5,903,136 A | 5/1999 | Takahashi et al. |
| 5,905,364 A | 5/1999 | Ookita |
| 5,969,508 A | 10/1999 | Patino et al. |
| 6,002,237 A | 12/1999 | Gaza |
| 6,037,750 A | 3/2000 | Von Novak |
| 6,198,252 B1 | 3/2001 | Mukainakano |
| 6,608,482 B2 | 8/2003 | Sakai et al. |
| 6,859,014 B2 | 2/2005 | Bohne et al. |
| 6,924,620 B2 | 8/2005 | Santana, Jr. |
| 7,598,709 B2 | 10/2009 | Guang et al. |
| 2001/0011882 A1 | 8/2001 | Maloizel et al. |
| 2002/0079865 A1 | 6/2002 | Thomas et al. |
| 2002/0130638 A1 | 9/2002 | Sherman |
| 2003/0057920 A1 | 3/2003 | Dotzler |
| 2003/0132732 A1 | 7/2003 | Thomas et al. |
| 2003/0141850 A1 | 7/2003 | Dotzler et al. |
| 2003/0152837 A1 | 8/2003 | Noh |
| 2003/0214268 A1 | 11/2003 | Breuch et al. |
| 2003/0234632 A1 | 12/2003 | Fang |
| 2004/0113587 A1 | 6/2004 | Bohne et al. |
| 2004/0263119 A1 | 12/2004 | Meyer et al. |
| 2005/0037256 A1 | 2/2005 | Mukainakano |
| 2005/0088146 A1 | 4/2005 | Faunce et al. |
| 2005/0090131 A1 | 4/2005 | Faunce et al. |
| 2005/0264263 A1 | 12/2005 | Tsenter |
| 2005/0275381 A1 | 12/2005 | Guang et al. |
| 2007/0075682 A1 | 4/2007 | Guang et al. |
| 2008/0012533 A1 | 1/2008 | Guang |
| 2008/0024090 A1 | 1/2008 | Guang |
| 2008/0191667 A1 * | 8/2008 | Kernahan et al. ............ 320/150 |

FOREIGN PATENT DOCUMENTS

| | | |
|---|---|---|
| JP | 2000277151 | 10/2000 |

* cited by examiner

RAPID CHARGE LITHIUM ION BATTERY CHARGER

CROSS REFERENCE TO RELATED APPLICATIONS

This application is a continuation of U.S. patent application Ser. No. 11/836,946, filed Aug. 10, 2007, now U.S. Pat. No. 7,598,709, which, in turn, is a divisional of U.S. patent application Ser. No. 11/241,718, filed on Sep. 30, 2005, now U.S. Pat. No. 7,626,362.

BACKGROUND OF THE INVENTION

1. Field of the Invention

The present invention relates to a battery charger and, more particularly, to a battery charger for rapidly and safely charging lithium ion batteries which automatically compensates for anticipated changes of the resistance of the battery charging circuit (i.e. external battery terminals, wires, and internal battery cell resistance) over time, due to, for example, oxidation of the external battery contacts, and provides a maximum and constant current to a battery cell over the anticipated resistance range of battery charging circuit in order to minimize the charging time of the battery cell.

2. Description of the Prior Art

Battery chargers for charging lithium-ion-type batteries are known in the art. Examples of such battery chargers are disclosed in U.S. Pat. Nos. 5,670,862; 6,002,237 and 6,859,014. Such lithium ion battery chargers are also disclosed in U.S. Patent Application Publication Nos. U.S. 2001/0011882 A1; U.S. 2003/0057920 A1 and U.S. 2003/0141850 A1; as well as Japanese Patent No. JP 20-00277151 and Chinese Patent No. CN 1269616. As is known in the art, such lithium ion batteries require constant current (CC) and constant voltage (CV) charging. In particular, initially such lithium ion batteries are charged with a constant current. In the constant current mode, the charging voltage is typically set to a maximum level recommended by the LiIon cell manufacturer based on safety considerations, typically 4.2V per cell. The charging current is limited by the circuit to a design level, based on the cell capability, charge time, needs and cost. Once the battery cell voltage rises sufficiently, the voltage drop across the series resistances in the battery charging circuit forces the charging current to drop below an initial charge current level. In particular, when the battery cell voltage Vb approaches the charging voltage Vc, the charging current tapers according to the formula: $I=(V_c-V_b)/R_s$, where I=the charging current, Vc=the charging voltage, Vb=the battery cell voltage and Rs=the resistance of the charging circuit including the external contact resistance, the resistance of the battery terminals and wires used to connect the circuit, as well as the internal resistance of the battery cell. As such, during the last portion of the charging cycle, typically about the last ⅓, the battery cell is charged at a reduced charging current, which means it takes more time to fully charge the battery cell.

In order to decrease the time to fully charge such lithium ion battery cells, many known battery chargers take into account the voltage drop across the battery circuit elements in order to maximize the amount of charging current during a constant current mode. One method of determining the voltage drop of the battery circuit resistance elements is to take the difference between the closed-circuit voltage (i.e. charging voltage), and the open circuit voltage, which is the battery cell voltage with no charging current. The closed-circuit voltage represents the voltage of the battery cell plus the voltage drops in the circuit as a result of resistance in the battery circuit, such as the battery terminals and the internal resistance of the battery cell. By subtracting the closed-circuit voltage from the open-circuit voltage, the voltage drop across the battery resistance circuit elements can be determined.

Various known battery chargers use this voltage drop to drive the battery charging voltage during a constant current mode in order to increase the amount of current applied to the battery cell during a constant current mode. By increasing the amount of current applied to the battery cell during a constant current mode, the battery cell is charged much faster.

Examples of lithium ion battery charger circuits that compensate for the voltage drop in the battery circuit in order to increase the charging current and thus decrease the charging time for a lithium ion battery are disclosed in U.S. Pat. Nos. 5,670,862; 6,859,014 and 6,002,237. More particularly, the '862 Patent teaches a compensation circuit for compensating for predetermined voltage drop in the battery circuit. The compensation circuit includes an operational amplifier as well as a resistor sized to take into account the expected electrical series resistance of the battery circuit. The compensation circuit is based on an assumed initial voltage drop across the various resistance elements in the circuit and compensates for this voltage drop to maintain a predetermined charging current during a constant current charging mode. Unfortunately, the resistance of the various resistance elements change over time due to various factors including oxidation of the external battery contacts used to connect the battery cell to the battery charger. The compensation circuit disclosed in the '862 patent does not take into account such changes in resistance over time. Accordingly, in time, the charging time of the battery cell increases.

The charging technique disclosed in the '014 patent also takes into account the voltage across various battery circuit elements. In particular, the voltage drop across the battery circuit elements is monitored. During a normal charging condition, a "full" charging current is applied to the battery. If the monitored voltage drop exceeds a predetermined value, the charging current to the battery is reduced to a low level for a predetermined time. After the predetermined time period has elapsed, the "full" charging current is restored to the battery. Unfortunately when the battery is being charged at a reduced current level, the amount of time required to fully charge the battery is increased.

U.S. Pat. No. 6,002,237, assigned to the same assignee as the assignee of the present invention, discloses a rapid charging method for charging a lithium ion battery cell that also takes into account the voltage drop across the external battery contacts s as well as the other battery circuit elements. The battery charging circuit disclosed in the '237 patent monitors the voltage drop across the various circuit elements in the battery circuit, as well as the battery cell voltage, to make sure that the maximum cell voltage is not exceeded. The battery cell voltage is measured by periodically interrupting the charging current flow to the battery cell and taking a voltage measurement. The potential difference between the battery cell voltage (i.e. open circuit voltage) and the battery circuit elements (i.e. closed-circuit voltage) is periodically determined. This potential difference represents the voltage drop across various elements in the battery circuit. This potential difference is then used to adjust the charging voltage to the battery during a constant current mode. By adjusting the charging voltage during a constant current mode, the charging current increases, thus decreasing the time for charging the lithium ion battery.

The system disclosed in the '237 patent requires periodic measurement of the potential difference between the battery cell voltage and the closed-circuit voltage, which includes the battery cell voltage as well as the potential drop across the battery circuit elements. Although the system disclosed in the '237 Patent provides a rapid charge methodology for lithium ion batteries, the intent of the system disclosed in the '237 patent is to reduce the charging time by increasing the charging current once the battery cell voltage starts to increase and then reduce the charging current if no compensation for the increasing battery cell voltage Vb takes place. Unfortunately, the battery charging circuit disclosed in the '237 patent does not take into account the changes in the series resistance values in the circuit over time and thus the effectiveness of the circuit to rapidly charge a lithium ion battery wanes over time as the resistance of the series resistance elements increases.

There is a need to further reduce the charging time of such lithium ion batteries.

SUMMARY OF THE INVENTION

Briefly, the present invention relates to a rapid charging circuit for a lithium ion battery. The battery charging circuit compensates for the voltage drop across the various resistance elements in the circuit plus an additional anticipated resistance to account for the increase in resistance of the series resistance elements over time, due to, for example, oxidation of the external battery contacts, used to connect the battery cell to the charging circuit. As such, the battery charging circuit is able to provide a maximum and constant current in order to rapidly charge the battery cell over the expected change in the resistance of the battery charging circuit. In order to safely charge the battery, the battery charger in accordance with the present invention periodically monitors the open-circuit voltage of the battery cell and reduces the charging voltage to the maximum voltage recommended by the battery cell manufacturer, such as 4.2 volts DC, when the battery cell voltage reaches a predetermined value.

DESCRIPTION OF THE DRAWING

These and other advantages of the present invention will be readily understood with reference to the following specification and attached drawing, wherein.

DETAILED DESCRIPTION

The present invention relates to a battery charger circuit and, in particular, a battery charger circuit for rapidly charging lithium ion battery cells. As is known by those ordinarily skilled in the art, such lithium ion batteries are charged in a constant current mode and in a constant voltage mode. In accordance with an important aspect of the invention, the battery charger circuit provides and maintains a constant and maximum charging current to the battery cell which not only compensates for the initial resistance of the series resistance elements but also the anticipated increase in resistance of the circuit over time, foe example due to oxidation of the battery cell contacts to provide rapid charging over the anticipated resistance change of the circuit. By taking into account the maximum anticipated resistances in the battery charging circuit, the battery charger circuit is configured to provide a charging voltage level, that is able to provide a maximum and constant charging current to rapidly charge the battery cell over the anticipated resistance range of the series elements. In order to protect the battery cell from exceeding its maximum recommended battery cell voltage during charging, the battery cell voltage is periodically monitored by turning off the charging current and measuring the battery cell voltage. When the system detects that the battery cell voltage has charged up to a predetermined level, at or slightly below, for example, the maximum charging voltage recommended by the battery cell manufacturer, for example, 4.175 volts DC, the charging voltage is reduced to the maximum recommended charging voltage to avoid over-charging the battery cell. The battery charging is thereafter terminated when the charging current drops below a predetermined value.

Figure 1:
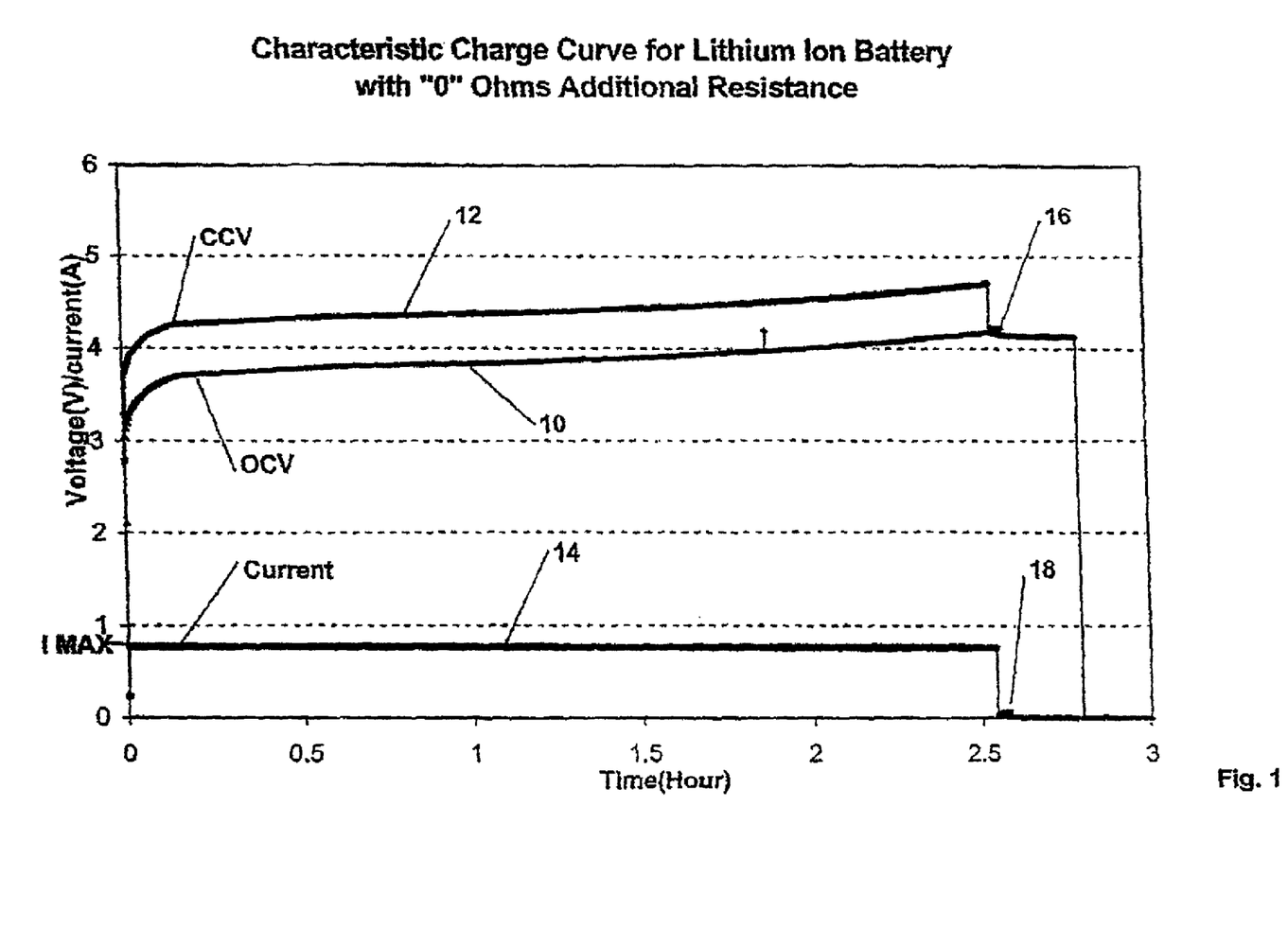
FIG. 1 is an exemplary characteristic charging curve for a lithium ion battery in which the battery circuit has an additional series resistance of zero ohms.
Figure 2:
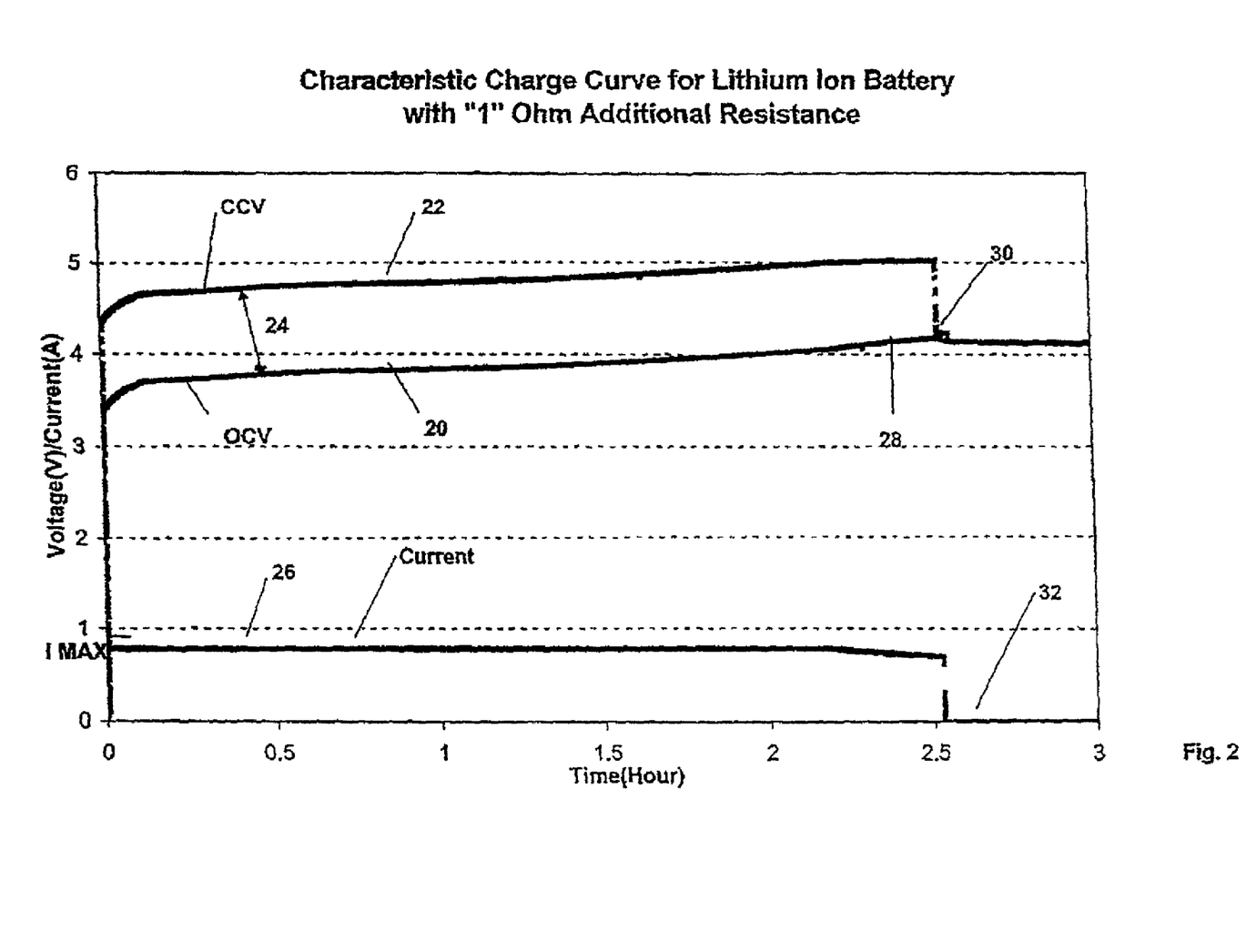
FIG. 2 is an exemplary characteristic charging curve for a lithium ion battery in which the battery circuit has an additional series resistance of one ohm.
Figure 3:
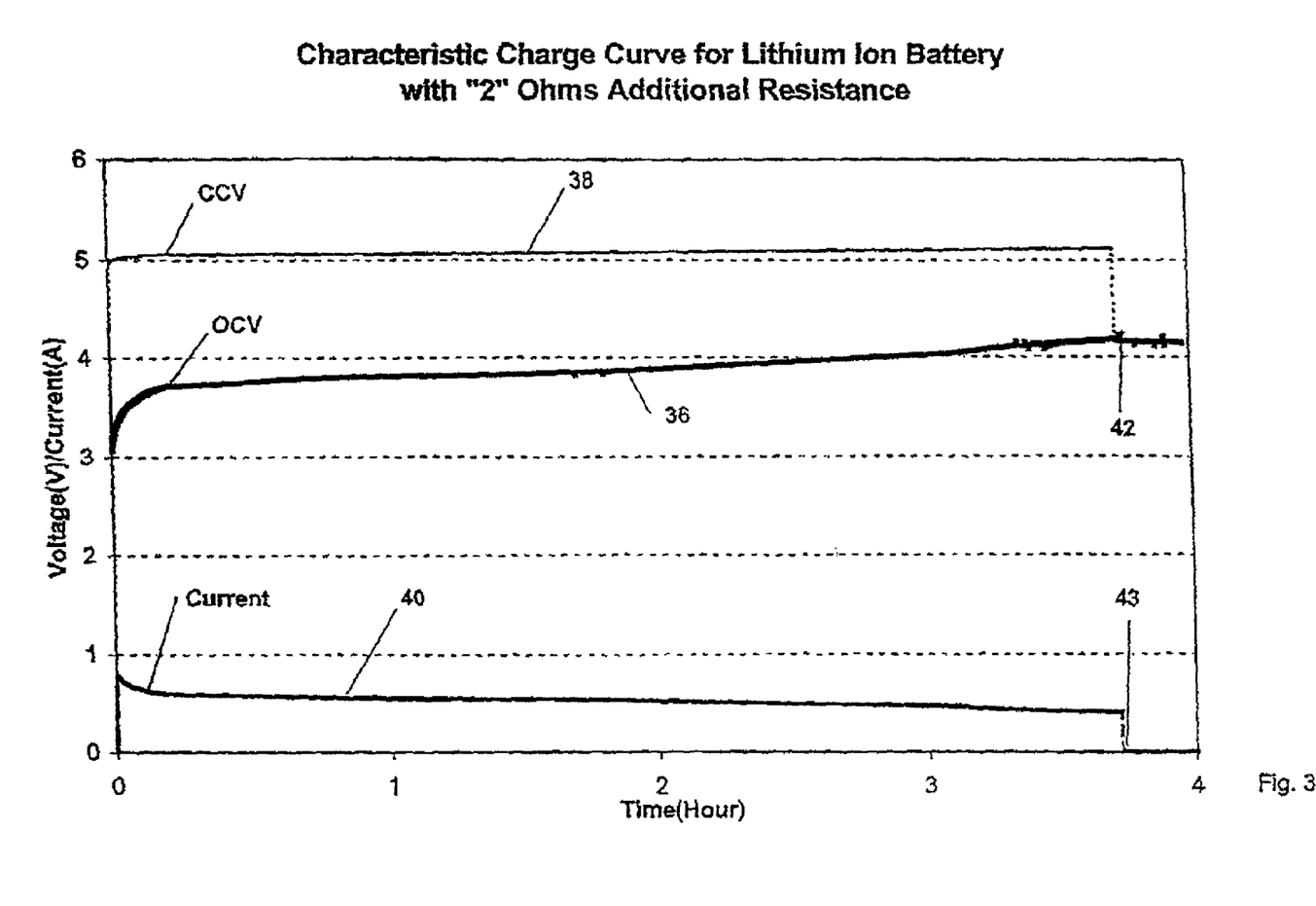
FIG. 3 is similar to FIG. 1, but for a battery circuit that has an additional series resistance of two ohms.

FIGS. 1-3 illustrate exemplary battery charging curves for an exemplary battery charging circuit for three different conditions as described below. In particular, FIG. 1 illustrates an exemplary battery charging curve for a condition when only the initial resistance of the battery charging circuit is is considered and 0 ohms of additional resistance. FIG. 2 is similar to FIG. 1, but for a design condition which includes an additional resistance of 1 ohm., to compensate for the change in resistance over time, primarily due, for example, oxidation of the battery external contacts. FIG. 3 is similar but for a condition when the resistance of the battery charging circuit includes an additional resistance of 2 ohms, which, in this example is not figured into the design, for example, due to cost considerations.

As shown in FIG. 1, the curve 10 refers to the open circuit battery cell voltage while the curve 12 relates to the charging voltage. As will be discussed in more detail below, the battery cell voltage (also known as open cell voltage or OCV) is measured by interrupting the current to the battery circuit and simply measuring the battery cell voltage. The curve 14 illustrates the charging current. The charging voltage, curve 12 (also known as the closed circuit voltage or CCV) equals the sum of the voltage drop across the resistances in the battery circuit plus the battery cell voltage. The charging voltage is measured with the current flowing through the circuit. During this ideal condition, the charging voltage 12 is selected at a level that is slightly higher than the maximum recommended cell voltage so that charging current is constant and at a maximum level as shown. The charging voltage 12 is the closed circuit voltage and is the sum of the battery cell voltage plus the voltage drops due to the various resistance elements in the battery charging circuit. Thus, the charging voltage 12 will track the battery cell voltage 10 as shown. When the battery cell voltage 10 reaches a predetermined value, for example, a value at or near the maximum recommended battery cell voltage, as indicated by the point 16, the charger switches to constant potential mode and the charging voltage 12 is reduced to the maximum recommended battery cell charging voltage. The charging current 14 then begins to taper, as indicated by the point 18, and is terminated when the charging current 14 drops below a predetermined level.

FIG. 2 illustrates a condition where the resistance of the battery charging circuit is increased by 1 ohm., for example, due to the oxidation of the battery cell contacts. In accordance with the present invention, an additional resistance due to the change in resistance over time is considered. As such, as shown in FIG. 2, the maximum charging current will be the same as the condition illustrated in FIG. 1. In particular, the battery cell voltage is illustrated by the curve 20 The curve 22 represents the charging voltage. The charging voltage The arrow 24 represents the potential difference between the closed-circuit voltage (CCV) and the open-circuit voltage (OCV). This potential difference represents the voltage drop across the various circuit elements and in this case, the additional 1 ohm. As indicated in FIG. 2, the CCV curve 22 is higher than the charging voltage for the condition illustrated in FIG. 1, in order to compensate for the additional 1 ohm of resistance and at the same time provide the maximum charging current of $I_{max}$ as in FIG. 1. As such, the battery charger circuit is configured to provide and maintain $I_{max}$ for the anticipated resistance change of the battery charging circuit-in this case 1 ohm. As shown, the charging current 26 remains constant during the constant current mode to charge the battery cell as rapidly as possible. In order to prevent the battery cell from being charged at a voltage that exceeds a predetermined level as discussed above, the system periodically checks the battery cell voltage to determine if the battery cell voltage reaches the predetermined value. When the battery cell reaches the predetermined value as indicated by the point 28, the charging voltage is reduced to a value at or below the maximum recommended voltage, as indicated by the segment 30 until the battery cell is fully charged; i.e. the charging current drops below a minimal value, such as 100-200 mA. When the charging current drops to this range, for example, as indicated by the point 32, the charging is considered complete and the charger voltage is turned off.

FIG. 3 is similar to FIG. 2, but illustrates a condition that is designed for in this example; a condition when the resistance of the charging circuit is increased by 2 ohms. In this example, the battery cell voltage is identified with the reference numeral 36, while the charging voltage is identified with the reference numeral 38. The charging current is illustrated with the curve 40. In this example, since the charging circuit was designed for a anticipated increased charging circuit resistance of 1 ohm, the maximum available charging voltage due to design based on cost is a little over 5.0 volts DC. As shown, during this condition, the battery charger can still charge the battery cell but not as rapidly when the circuit resistance was lower, as indicated in FIGS. 1 and 2. For example, during this condition, the total time to charge the battery cell is about 3.8 hours, as opposed to the conditions illustrated in FIGS. 1 and 2 which illustrate a total charging time of about 2.5 hours. When the battery cell voltage reaches the maximum predetermined voltage, as indicated by the point 42, the charging voltage is reduced to the maximum recommended cell charging voltage. The system then turns off as discussed above when the charging current reaches a predetermined value, as indicated by the point 43. As shown by point 40, during this condition, with an additional series resistance of 2 ohms, the battery charger is unable to maintain a constant current and tapers during the constant current mode.

Figure 4:
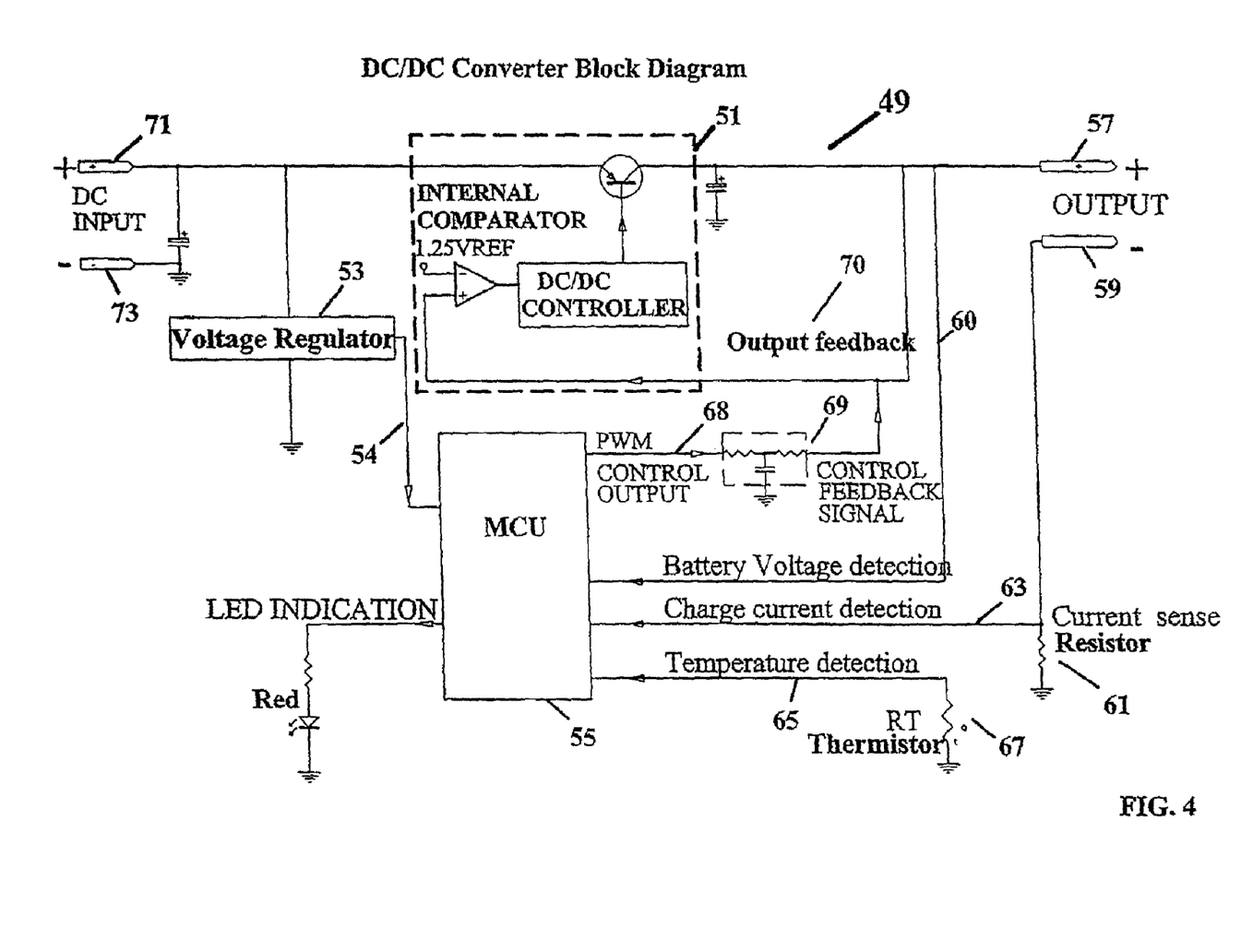
FIG. 4 is a block diagram of an exemplary battery charger circuit in accordance with the present invention.

An exemplary block diagram for a charger in accordance with the present invention is illustrated in FIG. 4 and is generally identified with the reference numeral 49. The charger includes three main components: a DC-DC converter 51, configured to receive an input voltage of, for example, 9-16 volts DC, a voltage regulator 53 and a microprocessor unit (MCU) 55. In general, the voltage regulator 53 is used to provide a 3 volt reference for the MCU 55 along line 54. The DC/DC Converter 51 generates the voltage and current to be delivered to its positive output terminal 57 for constant current and constant voltage charging of a battery cell to be charged. A negative terminal 59 is connected to system ground by way of a current sense resistor 61. The MCU 55 generates a pulse width modulated (PWM) signal along line 68. This PWM signal may be filtered by a filter circuit 69 and is used to control the voltage output level of the DC/DC Converter 51.

The output of the DC/DC Converter 51 to the positive terminal 57 is under the control of the MCU 55 as a function of one or more battery characteristics. More specifically, the MCU 55 monitors three battery characteristics: battery voltage; charging current; and battery temperature The open circuit voltage of the output terminal 57 is monitored via line 60 during an open circuit condition when no charging current is being delivered to the positive output terminal 57 by simply turning off the DC/DC Converter 51 and measuring the voltage. Since no current flows in the battery circuit during this condition, the measured voltage on line 60 represents the open circuit battery cell voltage. The charging current to the battery cell is sensed by way of line 63. In particular, a current sense resistor 61 that is serially connected between the negative charger terminal 59 and system ground provides a voltage signal on line 63 that is representative of the charging current applied to the battery cell. As mentioned above, the charging current is sensed in order to maintain a constant current during a constant current mode and detect when charging is complete. The battery temperature is sensed by a thermistor 67 that is connected to the MCU 55 by way of a line 65. The voltage output of the thermistor is representative of the battery temperature.

In particular, in accordance with an important aspect of the invention, the output level of the DC/DC Converter 51 is designed to provide a charging voltage, typically greater than the maximum recommended battery cell voltage, which compensates for the maximum expected voltage drop of the various resistance elements in the battery charging circuit to provide and maintain a maximum charging current to the battery cell until the battery cell is charged to its maximum recommended value, thus reducing the charging time of the battery. The system periodically monitors the battery cell voltage to determine when the battery cell voltage is either at or near its maximum recommended voltage (i.e. 4.2 volts). When the battery cell reaches a value around its maximum recommended value, the battery charging voltage is reduced to a value at or below the maximum recommended battery cell voltage by way of a feedback loop 70 in order to safely charge the battery cell. After the charging voltage is reduced, the system monitors the charging current and terminates charging when the charging current drops below a predetermined value.

The circuit illustrated in FIG. 4 may be used in conjunction with a cigarette lighter adapter (CLA) for charging various electronic devices. The principles of the present invention are also applicable to AC chargers, which include a switched mode power supply or AC/DC adapter.

Figure 5:
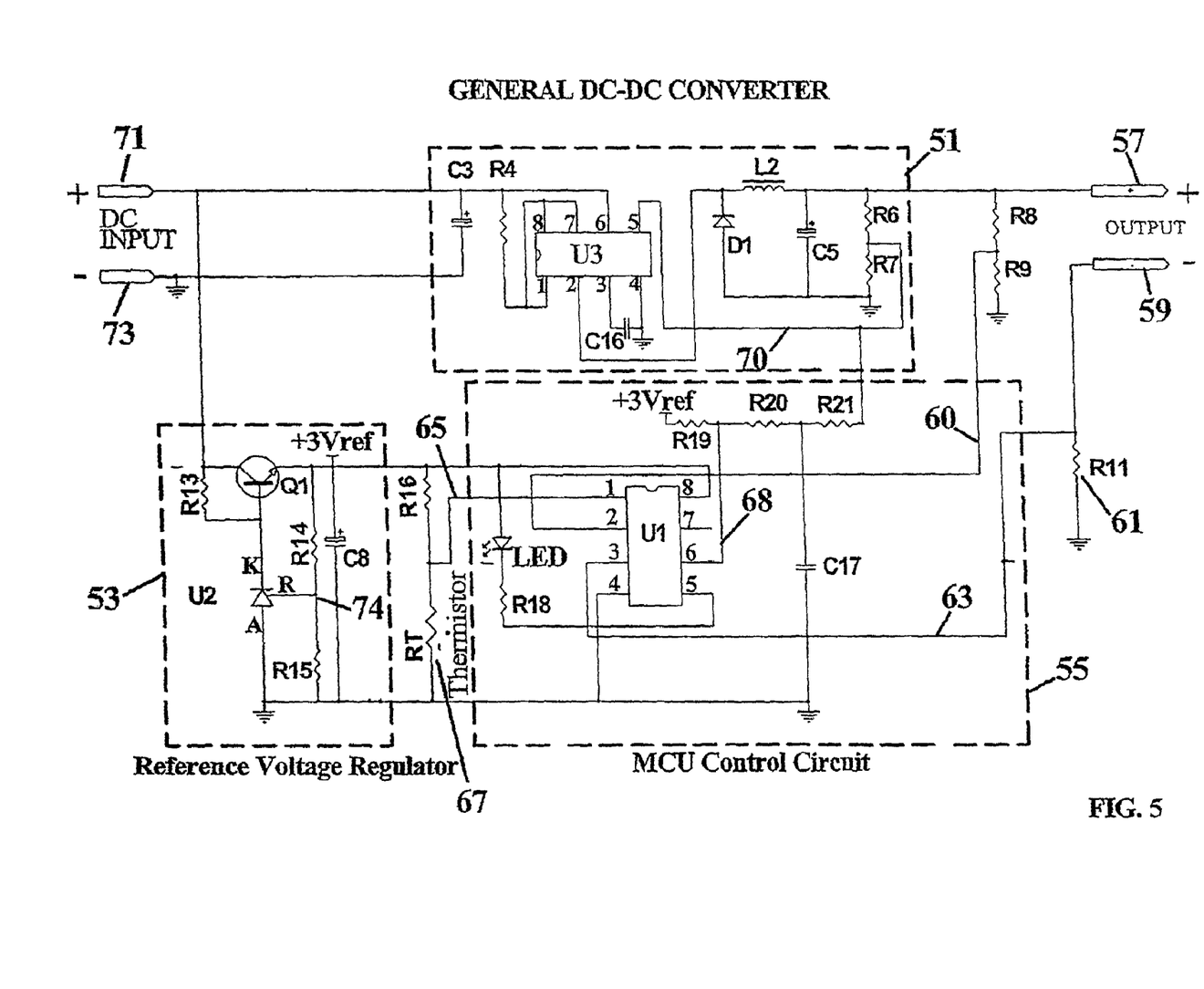
FIG. 5 is a schematic diagram of the exemplary battery charger circuit illustrated in FIG. 4.

A more detailed schematic is illustrated in FIG. 5. In particular, the reference voltage regulator 53 may include a 3 terminal programmable shunt regulator U2, for example a Fairchild Model No. TL431, a transistor Q1 and a plurality of resistors R13, R14, R15 and a capacitor C8. The input power is provided by an unregulated source of DC voltage in the range of, for example, 9-16 volts DC, from an AC/DC power supply or an automotive electrical system, at a positive input terminal 71. A negative input terminal 73 is connected to system ground. As mentioned above the reference voltage regulator is used to provide a 3-volt reference to the MCU 55. The transistor Q1 is a regulation transistor that is under the control of the shunt regulator U2. The emitter of the transistor Q1 is attached to a voltage supply terminal Vcc of a microprocessor U1 that forms part of the MCU 55. The collector terminal of the transistor Q1 is connected to the positive input terminal 71, while the base is connected to the shunt voltage regulator U1. A resistor R13, connected between the collector and base of the transistor Q1 is used to provide bias current for the transistor Q1 and the shunt regulator U2. The K and A terminals of the shunt regulator U2 are connected between the base of the transistor Q1 and system ground. A voltage divider consisting of the serially coupled resistors R14 and R15 is connected between the emitter terminal of the transistor Q1 and ground. A node 74 defined between the resistors R14 and R15 is connected to an R terminal of the shunt regulator U2. The R pin of the shunt regulator U2 is used for feedback control, which in turn controls the K pin to maintain a constant voltage at the emitter of the transistor Q1. The output of the regulator 53 is 2.495*R15/(R14+R15)=3 volts. A filter capacitor C8 may be connected between the emitter terminal of the transistor Q1 and ground to absorb the noise.

The DC/DC converter 51 may be a buck converter which includes a switching element, for example, a Fairchild Model No. 34063, an inductor L2, a diode D1, a plurality of capacitors C3, C5, C16 and various resistors R4, R6 and R7. The resistors R6 and R7 form a voltage divider and are used to sense the output voltage of the DC/DC converter 51. This output voltage is fed back to pin 5 of U3. The buck converter U3 controls its output switching pulse on pin 2 in order to maintain a constant output voltage based upon the feedback voltage applied to pin 5. The inductor L2, freewheeling diode D1, capacitor C5 along with the resistors R6 and R7 form an energy storage circuit. In particular, the inductor L2, coupled between the output of the buck converter U3 (i.e. pin 2) and the output terminal 57, stores the output pulse energy from the buck converter U3 and provides a stable output current. The diode D1, for example, a Schottky diode, provides current to the inductor L2 during low periods of the output pulse from the buck converter U3. During such periods, current flows through the inductor L2, the free wheeling diode D1 and the resistors R6 and R7. A capacitor C5 may be connected across the resistors R6 and R7 to absorb the switching noise and smooth out any ripple voltage and ripple current.

The capacitor C16 is a timing capacitor and is used to set the timing of an internal oscillator within the buck converter U3. An electrolytic capacitor C3 may be connected across the input terminals for noise filtering and to stabilize the voltage applied to the input terminals 71 and 73. A sensing resistor R4 may be connected between the input terminal 71 and pins 1 and 8 of the buck converter U3. The resistor R4 is used to sense the input current to the buck converter U3. If the input current to the buck converter U3 is too high, for example, due to switching, the buck converter U3 switches off its internal power transistor.

The MCU 55 is used to control the output voltage of the buck converter U3. The MCU 55 includes a microprocessor U1, for example, an Atmel Model TINY13, a plurality of resistors R8, R9, R11, R16, R18, R19, R20 and R21, a thermistor RT, a capacitor C17 and an LED.

Three inputs are applied to the microprocessor U1: charging current, battery voltage and battery temperature. The thermistor RT is used to sense the battery temperature and is applied via line 65 to pin 1 of the microprocessor U1. The resistor R16 bias voltage for the thermistor RT. The resistor R11 is used to sense the charging current to the battery as discussed above and is applied to pin 3 of the microprocessor U1 via line 63. The resistors R8 and R9 form a voltage divider and are used to provide the microprocessor U1 with the battery cell voltage and the buck converter U3 output voltage. A node defined between the serially coupled resistors R8 and R9 is applied to pin 2 of the microprocessor via line 60.

The microprocessor U1 monitors the charging current, battery voltage and battery temperature and generates a feedback signal that is used to control the output voltage of the buck converter U3. In particular, the microprocessor U1 periodically monitors the open circuit voltage by turning off the current from the buck converter U3 and measuring the voltage. Since no current is flowing in the circuit, the open circuit voltage represents the battery cell voltage. This battery cell voltage is checked to see if it is at or below the maximum predetermined battery cell voltage. In particular, the microprocessor adjusts the output pulse width of its PWM on its pin 6, which is applied to pin 5 of the buck converter U3 by way of a PWM filter formed from the resistors R19, R20 and R21 and the capacitor C17, which converts the pulse to a constant DC value that is proportional to the width of the pulse. The magnitude of the DC value is then applied to pin 5 of the buck converter U3, which controls the output voltage of the buck converter U3.

In order to detect the battery cell voltage, the charging current is set to zero and the battery cell voltage is measured at the +output terminal 57 (FIG. 5). In particular. The battery cell voltage is applied to the $V_{sense}$ terminal of the microprocessor U1 by way of the voltage divider formed from the resistors R8/R9. In order to measure the battery cell voltage, the microprocessor U1 sets a "PWM Control Output" signal (i.e. pin 5) on the DC-DC Converter 51 high. The PWM Control Output signal is compared with an internal reference voltage. When the PWM Output Control signal is high, its magnitude will be greater than the internal reference voltage which causes the DC-DC Converter 51 to turn off its output, thus turning off the charging current to the battery. When the charging current is off, the battery cell voltage is measured as discussed above.

Figure 6:
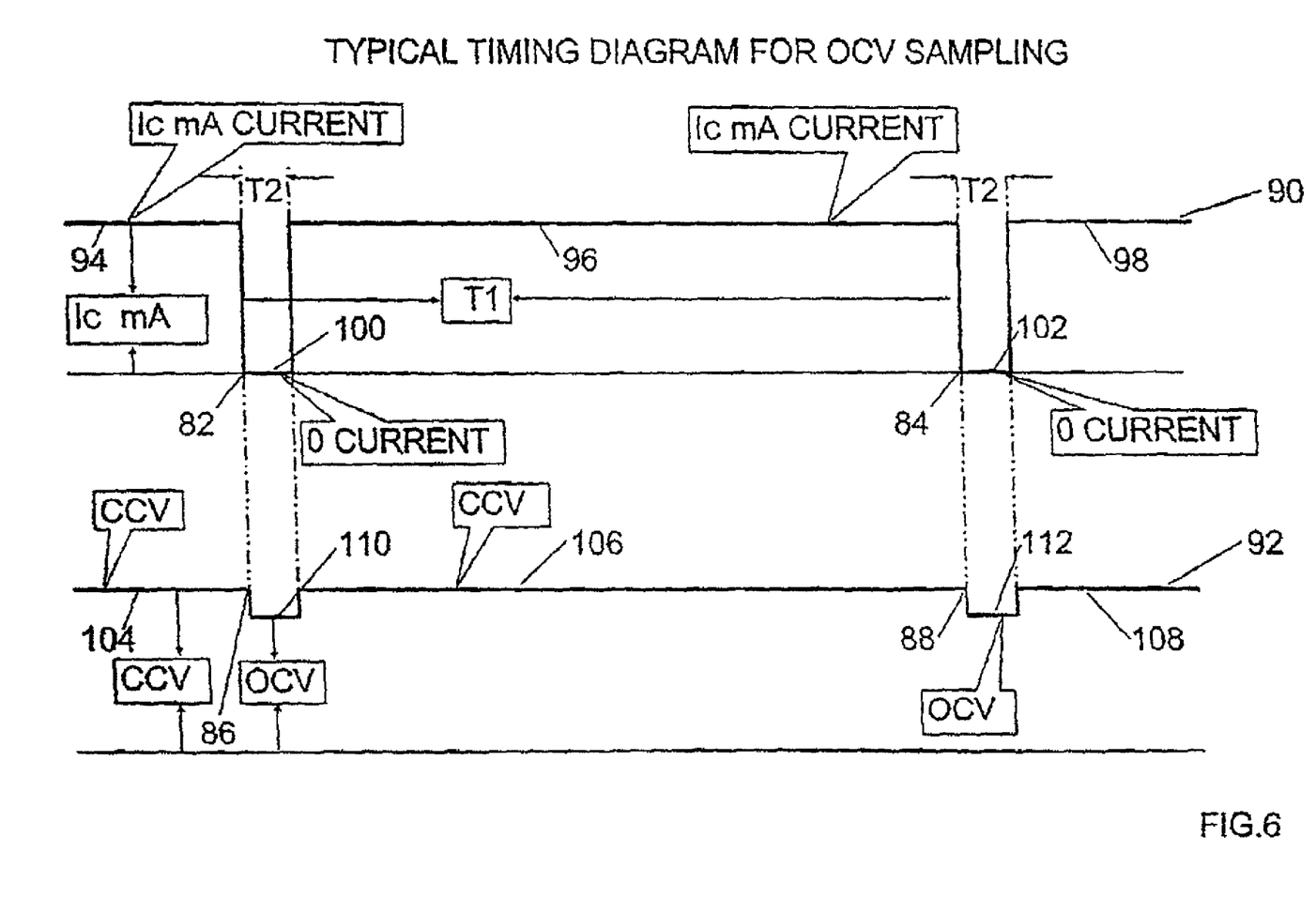
FIG. 6 is an exemplary timing diagram illustrating the periodic measurement of the battery cell voltage.

The battery cell voltage is periodically measured as illustrated in FIG. 6. Referring to FIG. 6, the battery cell voltage is periodically measured as indicated by the pulses, identified with the reference numerals 82, 84, 86, and 88. As mentioned above, during periodic measurement of the battery cell voltage, the charging current is interrupted. More specifically, the waveform 90 illustrates the charging current during a portion of a charging cycle while the waveform 92 illustrates the charging voltage. As shown, the charging current is maintained at a value IC mA during a portion of the charging cycle as indicated by the segments 94, 96, and 98 of the waveform 90. During periods when the battery cell voltage is measured, the charging current is dropped to zero mA, as indicated by the segments 100 and 102 for a time period, for example, $t_2$. Similarly, the segments 104, 106, and 108 represent portions of the charging cycle when the charging voltage (i.e., closed circuit voltage) is applied to the battery cell. During the time period $t_2$, the voltage of the battery cell is measured as indicated by the line segments 110 and 112. As shown, the time period $t_1$ represents the total time for a sampling cycle. The time period $t_2$ represents a portion of the sampling cycle as shown.

Low Ripple Output

In accordance with another important of the invention, the lithium ion (LiIon) battery charging circuit is configured to provide a low ripple output. Other known battery charging circuits, such as the NiMH battery charger topology disclosed in commonly owned pending patent application Ser. No. 10/897,285, filed on Jul. 22, 2004, uses a microprocessor with an on board pulse width modulator (PWM) together with feedback provided by measurement of current (constant current) or battery voltage (constant voltage) to drive a transistor/FET switch of a buck regulator. Because of the relatively slow measurement acquisition time for current or voltage feedback and the overhead of executing code and loading new values for the pulse width modulator registers, a phase difference or lag time exits between the measurement and driving of the buck regulator transistor. If the input voltage varies periodically to the buck regulator, a component of this voltage ripple passes through the buck regulator. This ripple component is typically transparent for NiMH batteries but can be too high for optimum charging of LiIon batteries.

Lithium Ion charging systems require very accurate voltage measurements and control. The standard buck regulator as described in the above identified patent application is inadequate for LiIon voltage charging due to the large voltage swings caused by the phase error. To correct this problem for LiIon charging, a secondary control loop is created using the buck controller U3 configured to operate typically between 50 kHz to 100 kHz as set by the capacitor C16. The buck regulator's control node is set using the divider formed by the R6 and R7. This node is connected to the inverting side of the internal comparator, pin 5, on the buck regulator U3. The non-inverting side is tied to the internal 1.25 volt reference. As the input to pin 5, when the inverting side of the comparator exceeds the 1.25 volt threshold, the duty cycle of the buck regulator's internal PWM will decrease, causing the divider node voltage formed by the resistors R6 and R7 to maintain 1.25 volts. This high frequency PWM feedback effectively regulates the output of the buck regulator in a fast loop and reduces ripple to acceptable levels for LiIon charging.

The primary control loop is established by the microprocessor U1. In particular, the microprocessor U1 controls the control node of the buck regulator U3 by modulating the duty cycle to the RC network formed by the resistor R20 and the capacitor C17. The time constant of the RC circuit formed by the resistor R20 and the capacitor C17 must be much greater the modulation period. The voltage created by the RC circuit creates a potential difference across the resistor R21. This voltage drop sinks current through the resistor R6 dropping the reference node to the buck regulator U3. The charger can run in either constant current mode or constant voltage mode under software control and will adjust the RC voltage appropriately. In a constant current mode, the modulation period is a function of the voltage measured at the resistor R11. In a constant voltage mode, the modulation period is determined by the voltage measured through the voltage divider formed by the resistors R8 and R9. The advantage to this approach is that the primary loop is now responsible for only setting a reference level to the buck regulator U3. The primary loop speed is not critical and is compliant with the capability of the microprocessor U1. With this system, the microprocessor U1 is now capable of managing the mode, constant current or constant voltage, and the magnitude of the output levels via software control and the resulting system output is tightly regulated and provides accurate, low ripple voltage needed to properly charge LiIon systems at low cost.

One of the functions of the microprocessor U1 is to make critical decisions as to the state of the battery cell. During start up, it is critical that the buck controller U3 be held in the off state to prevent current flow. Since the microprocessor power up sequence can take several milliseconds and buck regulator's sequence is on the order of microseconds the resistors R19, R20 and R21 are used as pullup resistors to the microprocessor U1 supply voltage Vcc. During the microprocessor start up period, pin#6 of the buck controller U3 stays in high resistance mode. The resistors R19, R20 and R21 form a voltage divider with the resistor R7 that drives the inverting side of the buck regulator's comparator to 1.43 volts which is well beyond the 1.25 volt regulation point of the buck regulator's reference. This effectively shuts down the buck regulator U3 until the microprocessor U1 can start up and take overall control of the system.

Flowchart

Figure 7:
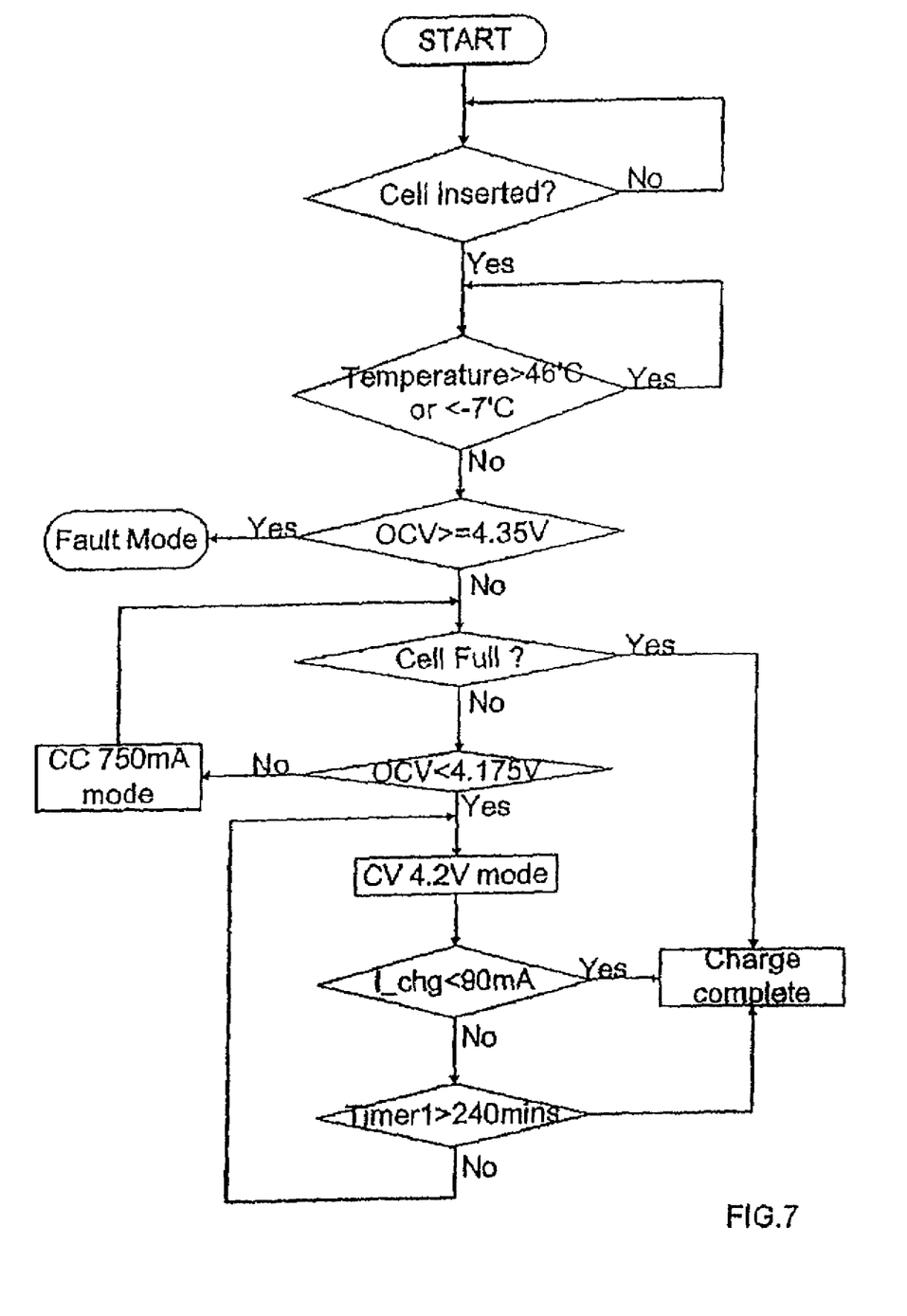
FIG. 7 is an exemplary flowchart for the battery charger in accordance with the present invention.

A flowchart for the exemplary battery charger is illustrated in FIG. 7. A flow chart for measuring the battery cell voltage is illustrated in FIG. 8.

Referring first to FIG. 7, the system first checks in step 120 to determine if a battery pack is inserted. The battery pack is sensed by measuring the voltage at the output terminal 57 by way of the voltage divider resistors R8/R9. When no battery pack is connected to the output terminals 57 and 59, no voltage will be present. When a battery pack is connected between the output terminals 57 and 59, the microprocessor U1 will measure a voltage across the output terminals 57, 59. If no battery pack is connected across the output terminals 57/59, the system loops back to step 120 waiting for a battery pack to be installed. Once the system detects that a battery pack has been connected to the output terminals 57, 59, the system checks in step 122 whether the temperature of the battery pack is at a temperature extreme, such as less than −7° C. or greater than 46° C. The temperature is sensed by a thermistor RT 67 (FIG. 5). If the temperature of the battery cell is greater than 46° C. or less than −7° C., the system loops back to step 122 and repeats the temperature check. During this condition, it is assumed that the battery cell is either too hot or too cold for charging. Alternatively, if the battery cell is not too hot or too cold, the system proceeds to step 124 and determines whether the battery cell voltage is greater than a predetermined value, for example, 4.35 volts. If so, the system assumes a fault and indicates a fault mode in step 126. However, if the battery cell voltage is less than 4.35 volts, the system checks in step 126 to determine whether the battery cell is fully charged. As discussed above, the full-charge condition of the battery cell is assumed to occur when the charging current falls below a nominal value, for example, 100 mA-200 mA. If so, the system proceeds to step 128 and indicates that the charge is complete. If the charging current is greater than the value indicated above, the system again checks the battery cell voltage to determine how close it is to the maximum recommended voltage of 4.2 volts. If the battery cell voltage is less than, for example, 4.175 volts, the system continues with a constant current mode in step 132 and loops back to step 130 until the battery cell voltage reaches about 4.175 volts. Once the battery cell voltage reaches 4.175 volts, the charging voltage is reduced in step 134 to the maximum recommended voltage of about 4.2 volts to avoid overcharging the battery in step 134. After the charging voltage is lowered to 4.2 volts, the system checks the value of the charging current in step 136. If the charging current is less than a predetermined value, for example, 90 mA, the system assumes that the charge is complete and proceeds to step 128. Alternatively, if the charging current is greater than mA, the system initiates a timer in step 138 and continues to charge at 4.2 volts until the timer times out. Once the timer times out, the system proceeds to step 128 and assumes that the charge is complete.

Figure 8:
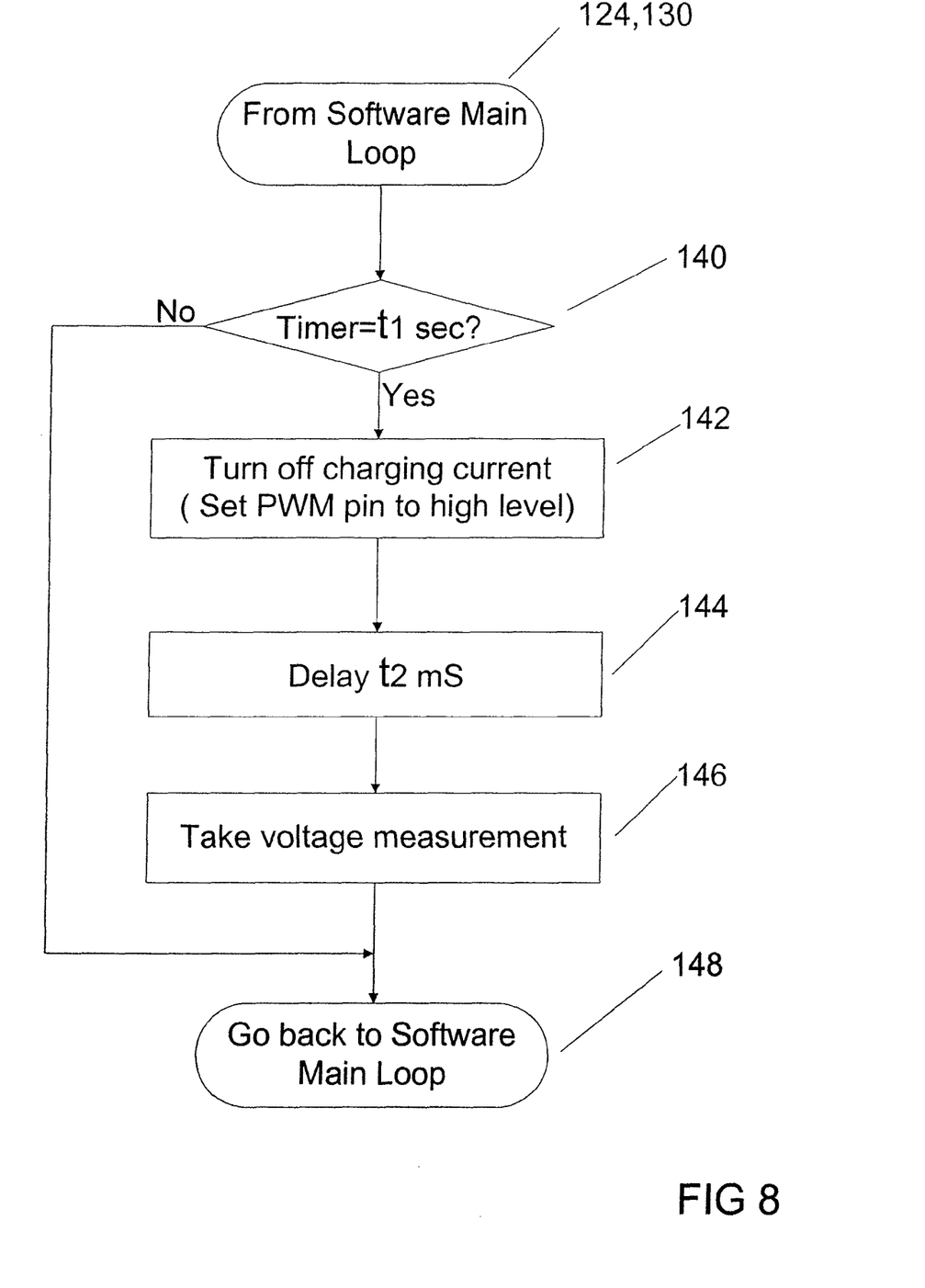
FIG. 8 is an exemplary flowchart for the periodic measurement of the battery cell voltage.

FIG. 8 is an exemplary flow chart that illustrates the steps for periodically determining the battery cell voltage as indicated in steps 124 and 130 of FIG. 7. As indicated in step 140, a sampling timing cycle $t_1$ is initiated on the falling edge of a current pulse 82. In other words, the timer $t_1$ is initiated when the charging current initially goes to 0 mA. As indicated in FIG. 6, at the end of a sampling cycle (i.e., at $t_1$), the charging current is turned off as indicated by the segments 100, 102 (FIG. 6) by setting the PWM output control pin 5 on the DC-DC converter 51 to a high level, as indicated in step 142. The high level is maintained for a time period $t_2$ as indicated by the pulses 82, 84 (FIG. 6) in step 144. During this time period $t_2$, the battery cell voltage is measured in step 146. The system returns to the main loop in step 148.

Obviously, many modifications and variations of the present invention are possible in light of the above teachings. Thus, it is to be understood that, within the scope of the appended claims, the invention may be practiced otherwise than is specifically described above.

We claim:

1. A method for charging a battery by way of a battery charger, the battery and battery charger forming a battery charging circuit, the method comprising steps of:
   (a) selecting a constant charging current to charge the battery based upon one or more predetermined design considerations;
   (b) charging the battery at said constant charging current during a constant current mode of charging;
   (c) repeatedly monitoring the battery open circuit voltage;
   (d) switching to a constant voltage mode of charging when said battery open circuit voltage reaches a predetermined voltage value;
   (e) charging said battery with a constant voltage after said battery open circuit voltage reaches said predetermined value;
   (f) monitoring the charging current in said constant voltage mode; and
   (g) terminating charging when said charging current drops below a predetermined current value.

2. The method as recited in claim 1, wherein step (a) comprises:
   (a) selecting a constant charging current to charge the battery as a function of the battery charging time.

3. The method as recited in claim 1, wherein step (a) comprises:
   (a) selecting a maximum charging current to charge the battery as a function of the cost of the battery charger used to charge the battery.

4. The method as recited in claim 1, wherein step (a) comprises:
   (a) selecting a charging voltage that is selected to enable the charging current to be maintained constant over the anticipated resistance changes of said battery charger circuit.

5. A method for charging a battery by way of a battery charger, the battery and battery charger forming a battery charging circuit, the method comprising the steps of:
   (a) selecting a closed circuit charging voltage as a function of a predetermined design resistance of said battery charging circuit;
   (b) selecting a charging current based upon a predetermined charging time;
   (c) charging the battery at said constant charging current during a constant current mode of charging;
   (d) repeatedly monitoring the battery open circuit voltage;
   (e) switching to a constant voltage mode of charging when said battery open circuit voltage reaches a predetermined voltage value;
   (f) charging said battery with a constant voltage after said battery open circuit voltage reaches said predetermined value;
   (g) monitoring the charging current in said constant voltage mode; and
   (h) terminating charging when said charging current drops below a predetermined current value.

* * * * *